United States Patent
Clift

(10) Patent No.: US 11,323,768 B2
(45) Date of Patent: May 3, 2022

(54) REDUCING LATENCY DURING SERVICE CHANGE AND IMPROVING ROBUSTNESS IN ADVANCED TELEVISION SYSTEMS COMMITTEE (ATSC) 3.0 SYSTEM

(71) Applicant: Sony Corporation, Tokyo (JP)

(72) Inventor: Graham Clift, San Diego, CA (US)

(73) Assignee: Sony Corporation, Tokyo (JP)

( * ) Notice: Subject to any disclaimer, the term of this patent is extended or adjusted under 35 U.S.C. 154(b) by 309 days.

(21) Appl. No.: 16/711,424

(22) Filed: Dec. 11, 2019

(65) Prior Publication Data

US 2021/0185388 A1   Jun. 17, 2021

(51) Int. Cl.
| | |
|---|---|
| *H04N 21/438* | (2011.01) |
| *H04N 21/434* | (2011.01) |
| *H04N 21/643* | (2011.01) |
| *H04N 21/84* | (2011.01) |
| *H04N 21/845* | (2011.01) |
| *H04N 21/435* | (2011.01) |

(52) U.S. Cl.
CPC ....... *H04N 21/4384* (2013.01); *H04N 21/435* (2013.01); *H04N 21/4345* (2013.01); *H04N 21/643* (2013.01); *H04N 21/84* (2013.01); *H04N 21/8456* (2013.01)

(58) Field of Classification Search
CPC ........... H04N 21/4384; H04N 21/4345; H04N 21/643; H04N 21/84; H04N 21/8456; H04N 21/435
See application file for complete search history.

(56) References Cited

U.S. PATENT DOCUMENTS

| | | | | |
|---|---|---|---|---|
| 2007/0280298 | A1* | 12/2007 | Hearn | H04N 21/6581 370/498 |
| 2017/0099513 | A1* | 4/2017 | Furbeck | H04N 21/85406 |
| 2019/0069004 | A1* | 2/2019 | Badawiyeh | H04N 21/44016 |

OTHER PUBLICATIONS

"RFC 4033, DNS Security Introduction and Requirements," Arends, R., Austein, R., Larson, M., Massey, D., and S. Rose, Internet Engineering Task Force, Fremont, CA, Mar. 2005.
"RFC 4055, Additional Algorithms and Identifiers for RSA Cryptography for use in the Internet X.509 Public Key Infrastructure Certificate and Certificate Revocation List (CRL) Profile," J. Schaad, B. Kaliski, R. Housley, Internet Engineering Task Force, Fremont, CA, Jun. 2005.
"ATSC Standard: ATSC 3.0 Interactive Content (A/344)", May 2, 2019.
"ATSC Standard: ATSC 3.0 Security and Service Protection", Aug. 20, 2019.
"ATSC Standard: ATSC 3.0 System", Sep. 17, 2019.
"ATSC Standard: Signaling, Delivery, Synchronization, and Error Protection (A/331)", Jun. 19, 2019.

(Continued)

*Primary Examiner* — Oschta I Montoya
(74) *Attorney, Agent, or Firm* — John L. Rogitz

(57) ABSTRACT

Techniques are described for expanding and/or improving the Advanced Television Systems Committee (ATSC) 3.0 television protocol in robustly delivering the next generation broadcast television services. Signaling indicates where the first few segments of a changed-to broadcast service can be obtained on the broadband network. Segments not including the live edge segments are downloaded and played immediately to reduce perceived latency in the service change until the broadcast segments arrive for presentation.

19 Claims, 6 Drawing Sheets

(56) References Cited

OTHER PUBLICATIONS

"RFC 3279, Algorithms and Identifiers for the Internet X.509 Public Key Infrastructure Certificate and Certificate Revocation List (CRL) Profile," L. Bassham, W. Polk, R. Housley, Internet Engineering Task Force, Fremont, CA, Apr. 2002.

"RFC 5280, Internet X.509 Public Key Infrastructure Certificate and Certificate Revocation List (CRL) Profile," D. Cooper, S. Santesson, S. Farrell, S. Boeyen, R. Housley, W. Polk, Internet Engineering Task Force, Fremont, CA, May 2008.

"RFC 5289, TLS Elliptic Curve Cipher Suites with SHA-256/384 and AES Galois Counter Mode (GCM)," E. Rescorla, Internet Engineering Task Force, Fremont, CA, Aug. 2008.

"RFC 5480, Elliptic Curve Cryptography Subject Public Key Information," S. Turner, D. Brown, K. Yiu, R. Housley, T. Polk, Internet Engineering Task Force, Fremont, CA, Mar. 2009.

"RFC 5652, Cryptographic Message Syntax (CMS)," R. Housley, Internet Engineering Task Force, Fremont, CA, Sep. 2009.

"RFC 5751, Secure/Multipurpose Internet Mail Extensions (S/MIME) Version 3.Message Specification," B. Ramsdell, S. Turner, Internet Engineering Task Force, Fremont, CA, Jan. 2010.

"RFC 5753, Use of Elliptic Curve Cryptography (ECC) Algorithms in Cryptographic Message Syntax (CMS)," S. Turner, D. Brown, Internet Engineering Task Force, Fremont, CA, Jan. 2010.

"RFC 5758, Internet X.509 Public Key Infrastructure: Additional Algorithms and Identifiers for DSA and ECDSA," Q. Dang, S. Santesson, K. Moriarty, D. Brown, T. Polk, Internet Engineering Task Force, Fremont, CA, Jan. 2010.

"RFC 5940, Additional Cryptographic Message Syntax (CMS) Revocation Information Choices," S. Turner, R. Housley, Internet Engineering Task Force, Fremont, CA, Aug. 2010.

"RFC 6960, X.509 Internet Public Key Infrastructure Online Certificate Status Protocol—OCSP," S. Santesson, M. Myers, R. Ankney, A. Malpani, S. Galperin, C. Adams, Internet Engineering Task Force, Fremont, CA, Jun. 2013.

"RFC 5019, The Lightweight Online Certificate Status Protocol (OCSP) Profile for High-Volume Environments," A. Deacon, R. Hurst, Internet Engineering Task Force, Fremont, CA, Sep. 2007.

* cited by examiner

REDUCING LATENCY DURING SERVICE CHANGE AND IMPROVING ROBUSTNESS IN ADVANCED TELEVISION SYSTEMS COMMITTEE (ATSC) 3.0 SYSTEM

FIELD

This application relates to technical advances necessarily rooted in computer technology and directed to digital television, and more particularly to Advanced Television Systems Committee (ATSC) 3.0.

BACKGROUND

The Advanced Television Systems Committee (ATSC) 3.0 suite of standards is a set of over a dozen industry technical standards as indicated in A/300 for delivering the next generation of broadcast television. ATSC 3.0 supports delivery of a wide range of television services including televised video, interactive services, non-real time delivery of data, and tailored advertising to a large number of receiving devices, from ultra-high definition televisions to wireless telephones. ATSC 3.0 also orchestrates coordination between broadcast content (referred to as "over the air") and related broadband delivered content and services (referred to as "over the top"). The term "service" as used herein is as defined in ATSC 3.0 to be a collection of media components presented to the user in aggregate; components can be of multiple media types. A service can be either continuous or intermittent. A service can be real time or non-real time, and a real time service can consist of a sequence of TV programs. ATSC 3.0 is designed to be flexible so that as technology evolves, advances can be readily incorporated without requiring a complete overhaul of any related technical standard. Present principles are directed to such advances as divulged below.

SUMMARY

As understood herein, ATSC 3.0 may provide television content using Dynamic Adaptive Streaming over HyperText Transfer Protocol (HTTP) (DASH), as described in the international standard ISO/IEC 23009-1, which specifies a Media Presentation Description (MPD). DASH delivers content in segments that contain one or more groups of pictures (GOP), essentially an intra coded frame (I-frame) that is coded independently of all other pictures followed by smaller frames that depend on the I-frame. Relatively short GOP facilitate adaptation to bandwidth changes and help prevent stalls, but longer GOP typically facilitate better encoding efficiency and quality. As further understood herein, however, while longer GOP are preferred for the noted advantages, during channel change a longer wait is required to obtain the first I frame of the first GOP for the new channel.

Present principles recognize the possibility of the use of signaling to indicate where the first few segments of a changed-to broadcast channel can be obtained on the broadband network, accessing these segments until the broadcast segments arrive for presentation. But as also understood herein, this is overly complicated for certain types of signaling, specifically for MPDs of a certain type. Apart from so-called "static" MPDs that are essentially references to recordings of content that can be played from start to finish, ATSC 3.0 also specifies the use of two types of dynamic live MPDs to facilitate content that is being encoded and delivered in real time and, in addition, to allow the replacement of certain content with replacement content tailored to the particular user. The first type of dynamic live MPD uses a segment template and numbering scheme, which may or may not need to be continually updated as the content is played, and which requires a clock on the receiver that is synchronized to the broadcast in order to correctly deduce the so-called "live edge" of the encoded stream relative to the segment numbering. When the receiver is rendering the "live edge" of the encoded stream, it is rendering the most recently available content from the stream. The segment numbering template type of MPD is appropriate for fixed receivers such as TVs where clock synchronization can be maintained even in a standby state, and cases where the segment encoding rarely changes such that generating multiple periods in the MPD is not required too often.

The second type of dynamic live MPD uses a segment timeline to accurately timestamp segments without any clock synchronization and is particularly appropriate for mobile receivers or where the live encoding of segments results in variable segment durations that are not known well in advance. The segment timeline is represented in the DASH MPD in the SegmentTimeline element Unlike the number indexing mode of segment templates, the explicitly defined segments in dynamic live segment timelines must always be available to the receiver and as such the last segment in the list is known to be the live edge without any need for clock synchronization. As such, this second type of dynamic live MPD addresses some of the challenges of a mobile device where the receiver clock may not be synchronized (or even synchronizable) with a broadcaster clock for technical reasons, particularly when a mobile receiver first tunes to a broadcast channel. A receiver first tuning to a particular channel, by deriving the live edge simply from the information in the MPD, can immediately start playing from there. When this principle is extended to include access to the same MPD and the same segments over a computer network, for example through broadband access to the internet, as well as through broadcast, the receiver can advantageously improve both its channel change time and its robustness against packet loss, the principles for which are described below.

The principles involve the concept that, through broadband access, the receiver can acquire content that had been broadcast in the near-recent past (e.g. close to, but not at the live edge). By acquiring such slightly older content and beginning the presentation with that, while at the same time buffering content received over the broadcast path, the receiver can not only provide "fast channel change" response from the point of view of the user, but can use the buffer delay as a way to opportunistically repair broadcast media segments that may in the future be received in error.

Accordingly, in one aspect, a digital television system such as an Advanced Television Systems Committee (ATSC) 3.0 system includes at least one receiver of ATSC 3.0 content with segment timeline signaling in a broadcast media presentation description (MPD). The receiver is programmed with instructions to configure the receiver to identify a command to acquire a first service not currently chosen by the viewer, and responsive to the command, access a Service List Table (SLT) to identify a computer network location at which to obtain information pertaining to accessing segments of the broadcast content associated with the first service. The instructions also are executable to remove at least a last "N" segments from a segment timeline data structure in the MPD associated with the first service, in which "N" is an integer at least equal to one, to render a truncated MPD having a last segment. The truncated MPD, when provided to the receiver's media player, causes the receiver's media player to begin playback at a point slightly behind the live edge. The instructions are further executable to use the information pertaining to accessing segments associated with the first service to access, on the computer network, the last segment in the truncated MPD, and play at least the last segment.

In an example, the instructions can configure the receiver to, responsive to accessing the last segment in the truncated MPD, replenish the truncated MPD with the last "N" segments from the segment timeline data structure to permit play of the last "N" segments from the segment timeline. The instructions may be further executable to, responsive to receiving, via broadcast, segments associated with the first service, change from accessing segments associated with the first service on the computer network to accessing segments associated with the first service via broadcast. In these example embodiments, the instructions may configure the receiver to play a segment "X" associated with the first service and accessed on the computer network and then switch to broadcast by playing a segment "X+1" received via broadcast. The segment "X+1" typically is delayed from a live point in a broadcast of the first service by a delay period greater than zero. This facilitates, during the delay period, the ability to identify as being damaged at least a first data element associated with the first service and then repairing the data element on the computer network to render a repaired data element that can be provided to the receiver for play of the repaired data element in lieu of the first data element.

In some implementations, the SLT is a first SLT broadcast on the first service that signals the computer network location at which to obtain a parallel copy of the broadcast MPD pertaining to accessing segments associated with the first service. For example, in the ATSC A/331 Signaling, Delivery, Synchronization, and Error Protection standard, in the SLT, the SLTInetUrl element, when available, identifies a base URL that can be used to acquire service layer signaling files for all Services in this SLT via the broadband path.

A digital television system can include at least one receiver of digital television content with segment timeline signaling, the receiver being programmed with instructions to configure the receiver to identify a command to tune to a first service not currently tuned to, responsive to the command, access a service list table (SLT) to identify a computer network location at which to obtain information pertaining to accessing segments of a broadcast media presentation description (MPD) associated with the first service, remove at least a last "N" segments from a segment timeline data structure in the MPD associated with the first service, wherein "N" is an integer at least equal to one, to render a truncated MPD having a last segment, use the information pertaining to accessing segments associated with the first service to access, on the computer network, the last segment in the truncated MPD, and play at least the last segment.

The details of the present application, both as to its structure and operation, can best be understood in reference to the accompanying drawings, in which like reference numerals refer to like parts, and in which:

DETAILED DESCRIPTION

Figure 1:
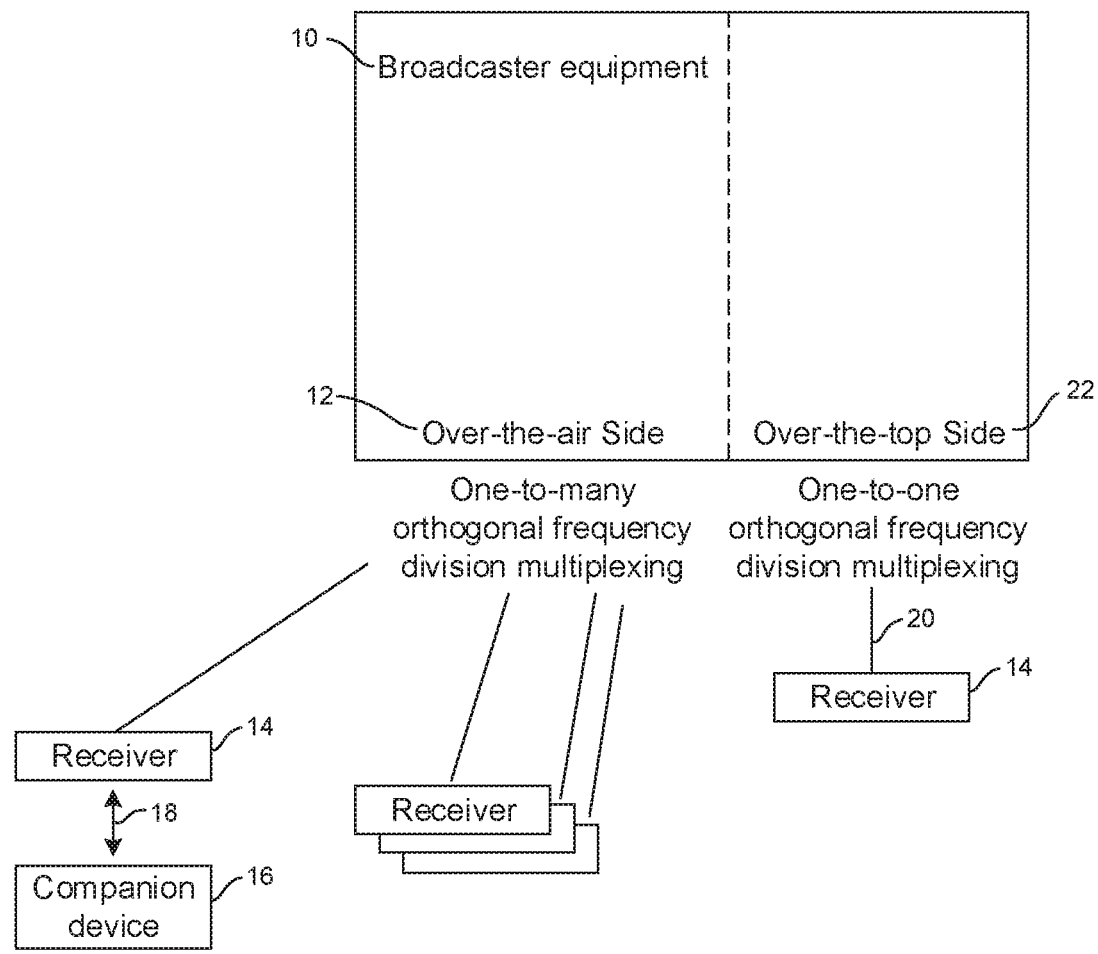
FIG. 1 is a block diagram of an Advanced Television Systems Committee (ATSC) 3.0 system.

This disclosure relates to technical advances in Advanced Television Systems Committee (ATSC) 3.0 television. A system herein may include ATSC 3.0 source components and client components, connected via broadcast and/or over a network such that data may be exchanged between the client and ATSC 3.0 source components. The client components may include one or more computing devices including televisions (e.g. smart TVs, Internet-enabled TVs), personal computers such as laptops and tablet computers, and mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google, such as Android®. These operating environments may be used to execute one or more browsing programs, such as a browser made by Microsoft or Google or Mozilla or other browser program that can access websites hosted by the Internet servers discussed below.

ATSC 3.0 source components may include broadcast transmission components and servers and/or gateways that may include one or more processors executing instructions that configure the source components to broadcast data and/or to transmit data over a network such as the Internet. A client component and/or a local ATSC 3.0 source component may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security.

As used herein, instructions refer to computer-implemented steps for processing information in the system. Instructions can be implemented in software, firmware or hardware and include any type of programmed step undertaken by components of the system.

A processor may be single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library. While flow chart format may be used, it is to be understood that software may be implemented as a state machine or other logical method.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to hypertext markup language (HTML)-5, Java/Javascript, C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Turning to FIG. 1, an example of an ATSC 3.0 source component is labeled "broadcaster equipment" 10 and may include over-the-air (OTA) equipment 12 for wirelessly broadcasting, typically via orthogonal frequency division multiplexing (OFDM) in a one-to-many relationship, television data to plural receivers 14 such as ATSC 3.0 televisions. One or more receivers 14 may communicate with one or more companion devices 16 such as remote controls, tablet computers, mobile telephones, and the like over a short range, typically wireless link 18 that may be implemented by Bluetooth®, low energy Bluetooth, other near field communication (NFC) protocol, infrared (IR), etc.

Also, one or more of the receivers 14 may communicate, via a wired and/or wireless network link 20 such as the Internet, with over-the-top (OTT) equipment 22 of the broadcaster equipment 10 typically in a one-to-one relationship. The OTA equipment 12 may be co-located with the OTT equipment 22 or the two sides 12, 22 of the broadcaster equipment 10 may be remote from each other and may communicate with each other through appropriate means. In any case, a receiver 14 may receive ATSC 3.0 television signals OTA over a tuned-to ATSC 3.0 television service and may also receive related content, including television, via the OTT (broadband) path. Note that computerized devices described in all of the figures herein may include some or all of the components set forth for various devices in FIGS. 1 and 2.

Figure 2:
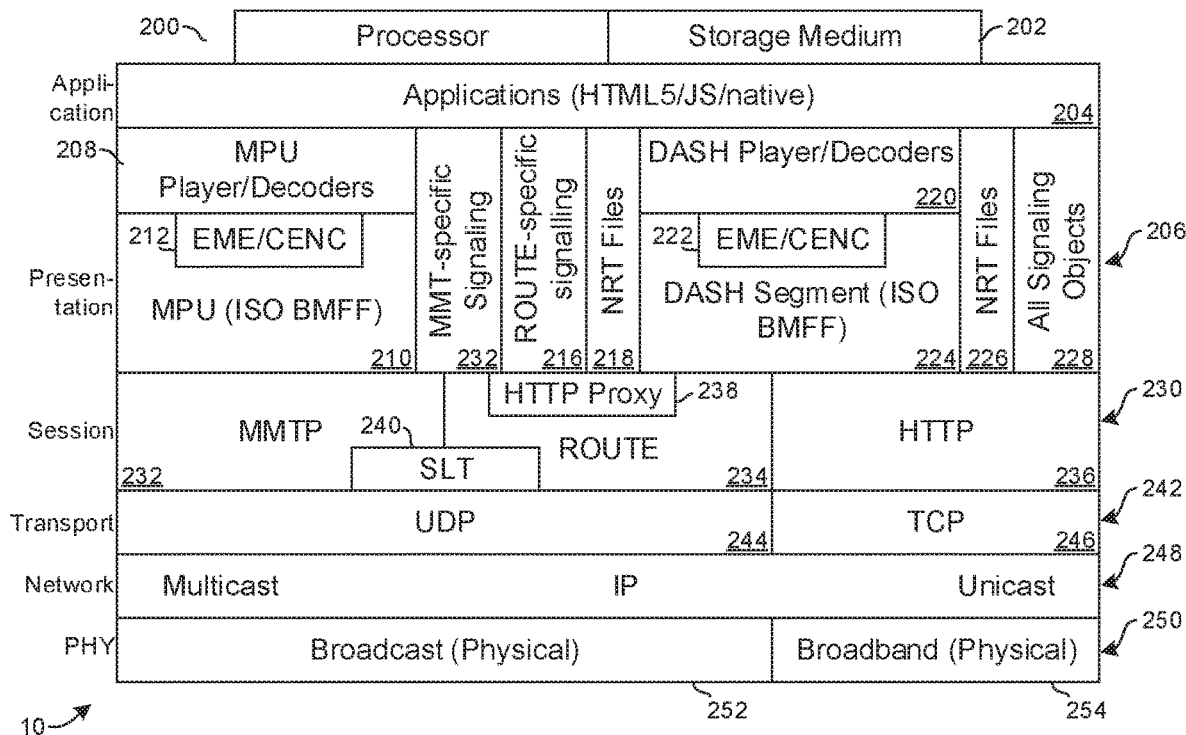
FIG. 2 is a block diagram showing components of the devices shown in FIG. 1.
Figure 2:
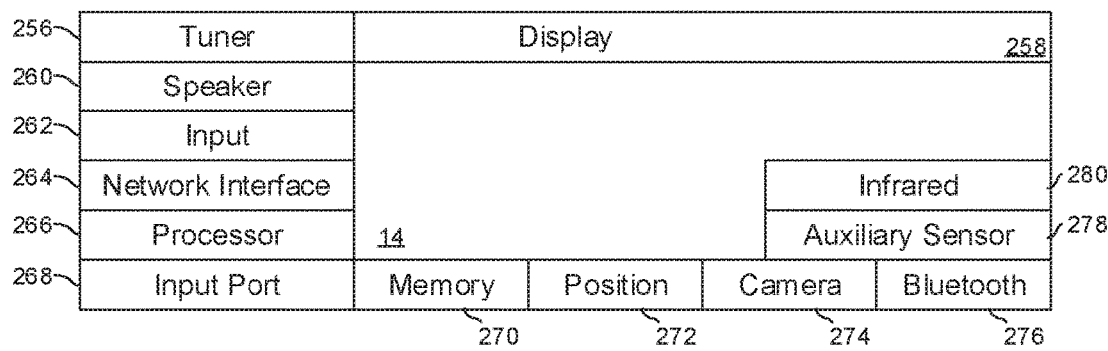

Referring now to FIG. 2, details of the components shown in FIG. 1 may be seen. FIG. 2 illustrates a protocol stack that may be implemented by a combination of hardware and software. As discussed below, using the ATSC 3.0 protocol stack shown in FIG. 2 and modified as appropriate for the broadcaster side, broadcasters can send hybrid service delivery in which one or more program elements are delivered via a computer network (referred to herein as "broadband" and "over-the-top" (OTT)) as well as via a wireless broadcast (referred to herein as "broadcast" and "over-the-air" (OTA)).

The broadcaster equipment 10 can include one or more processors 200 accessing one or more computer storage media 202 such as any memories or storages described herein to provide one or more software applications in a top-level application layer 204. The application layer 204 can include one or more software applications written in, e.g., HTML5/Javascript running in a runtime environment. Without limitation, the applications in the application stack 204 may include linear TV applications, interactive service applications, companion screen applications, personalization applications, emergency alert applications, and usage reporting applications. The applications typically are embodied in software that represents the elements that the viewer experiences, including video coding, audio coding and the run-time environment. As an example, an application may be provided that enables a user to control dialog, use alternate audio tracks, control audio parameters such as normalization and dynamic range, and so on.

Below the application layer 204 is a presentation layer 206. The presentation layer 206 includes, on the broadcast (OTA) side, broadcast audio-video playback devices referred to as Media Processing Units (MPU) 208 that, when implemented in a receiver, decode and playback, on one or more displays and speakers, wirelessly broadcast audio video content. The MPU 208 is configured to present International Organization for Standardization (ISO) base media file format (BMFF) data representations 210 and video in high efficiency video coding (HEVC) with audio in, e.g., Dolby audio compression (AC)-4 format. ISO BMFF is a general file structure for time-based media files broken into "segments" and presentation metadata. Each of the files is essentially a collection of nested objects each with a type and a length. To facilitate decryption, the MPU 208 may access a broadcast side encrypted media extension (EME)/common encryption (CENC) module 212.

FIG. 2 further illustrates that on the broadcast side the presentation layer 206 may include signaling modules, including either motion pictures expert group (MPEG) media transport protocol (MMTP) signaling module 214 or real-time object delivery over unidirectional transport (ROUTE) signaling module 216 for delivering non-real time (NRT) content 218 that is accessible to the application layer 204. NRT content may include but is not limited to stored replacement advertisements.

On the broadband (OTT or computer network) side, when implemented by a receiver the presentation layer 206 can include one or more dynamic adaptive streaming over hypertext transfer protocol (HTTP) (DASH) player/decoders 220 for decoding and playing audio-video content from the Internet. To this end the DASH player 220 may access a broadband side EME/CENC module 222. The DASH content may be provided as DASH segments 224 in ISO/BMFF format.

As was the case for the broadcast side, the broadband side of the presentation layer 206 may include NRT content in files 226 and may also include signaling objects 228 for providing play back signaling.

Below the presentation layer 206 in the protocol stack is a session layer 230. The session layer 230 includes, on the broadcast side, either MMTP protocol 232 or ROUTE protocol 234. Note that the ATSC standard provides an option to use MPEG MMT for transport, though it is not shown here.

On the broadband side the session layer 230 includes HTTP protocol 236 which may be implemented as HTTP-secure (HTTP(S)). The broadcast side of the session layer 230 also may employ a HTTP proxy module 238 and a service list table (SLT) 240. The SLT 240 includes a table of signaling information which is used to build a basic service listing and provide bootstrap discovery of the broadcast content. Media presentation descriptions (MPD) are included in the "ROUTE Signaling" tables delivered over user datagram protocol (UDP) by the ROUTE transport protocol.

A transport layer 242 is below the session layer 230 in the protocol stack for establishing low-latency and loss-tolerating connections. On the broadcast side the transport layer 242 uses (UDP 244 and on the broadband side transmission control protocol (TCP) 246.

The protocol stack also includes a network layer 248 below the transport layer 242. The network layer 248 uses Internet protocol (IP) on both sides for IP packet communication, with multicast delivery being typical on the broadcast side and unicast being typical on the broadband side.

Below the network layer 248 is the physical layer 250 which includes broadcast transmission/receive equipment 252 and computer network interface(s) 254 for communicating on the respective physical media associated with the two sides. The physical layer 250 converts machine access code (MAC) format to be suitable to be transported over the relevant medium and may add forward error correction functionality to enable error correction at the receiver as well as contain modulation and demodulation modules to incorporate modulation and demodulation functionalities. This converts bits into symbols for long distance transmission as well as to increase bandwidth efficiency. On the OTA side the physical layer 250 typically includes a wireless broadcast transmitter to broadcast data wirelessly using orthogonal frequency division multiplexing (OFDM) while on the OTT side the physical layer 250 includes computer transmission components to send data over the Internet.

A DASH Industry Forum (DASH-IF) profile sent through the various protocols (HTTP/TCP/IP) in the protocol stack may be used on the broadband side. Media files in the DASH-IF profile based on the ISO BMFF may be used as the delivery, media encapsulation and synchronization format for both broadcast and broadband delivery.

Each receiver 14 typically includes a protocol stack that is complementary to that of the broadcaster equipment.

A receiver 14 in FIG. 1 may include, as shown in FIG. 2, an Internet-enabled TV with a an ATSC 3.0 TV tuner (equivalently, set top box providing an audiovisual display to a TV monitor) 256. The software architecture in receiver 14 may be based on the Android® operating system. The receiver 14 alternatively may be implemented by a computerized Internet enabled ("smart") telephone, a tablet computer, a notebook computer, a wearable computerized device, and so on. Regardless, it is to be understood that the receiver 14 and/or other computers described herein is/are configured to undertake present principles (e.g. communicate with other devices to undertake present principles, execute the logic described herein, and perform any other functions and/or operations described herein).

Accordingly, to undertake such principles the receiver 14 can be established by some or all of the components shown in FIG. 1. For example, the receiver 14 can include one or more displays 258 that may be implemented by a high definition or ultra-high definition "4K" or higher flat screen and that may or may not be touch-enabled for receiving user input signals via touches on the display. The receiver 14 may also include one or more speakers 260 for outputting audio in accordance with present principles, and at least one additional input device 262 such as, e.g., an audio receiver/microphone for, e.g., entering audible commands to the receiver 14 to control the receiver 14. The example receiver 14 may further include one or more network interfaces 264 for communication over at least one network such as the Internet, a WAN, a LAN, a PAN etc. under control of one or more processors 266. Thus, the interface 264 may be, without limitation, a Wi-Fi transceiver, which is an example of a wireless computer network interface, such as but not limited to a mesh network transceiver. The interface 264 may be, without limitation, a Bluetooth® transceiver, Zigbee® transceiver, Infrared Data Association (IrDA) transceiver, Wireless USB transceiver, wired USB, wired LAN, Powerline or Multimedia over Coax Alliance (MoCA). It is to be understood that the processor 266 controls the receiver 14 to undertake present principles, including the other elements of the receiver 14 described herein such as, for instance, controlling the display 258 to present images thereon and receiving input therefrom. Furthermore, note the network interface 264 may be, e.g., a wired or wireless modem or router, or other appropriate interface such as, e.g., a wireless telephony transceiver, or Wi-Fi transceiver as mentioned above, etc.

In addition to the foregoing, the receiver 14 may also include one or more input ports 268 such as a high definition multimedia interface (HDMI) port or a USB port to physically connect (using a wired connection) to another CE device and/or a headphone port to connect headphones to the receiver 14 for presentation of audio from the receiver 14 to a user through the headphones. For example, the input port 268 may be connected via wire or wirelessly to a cable or satellite source of audio video content. Thus, the source may be a separate or integrated set top box, or a satellite receiver. Or, the source may be a game console or disk player.

The receiver 14 may further include one or more computer memories 270 such as disk-based or solid-state storage that are not transitory signals, in some cases embodied in the chassis of the receiver as standalone devices or as a personal video recording device (PVR) or video disk player either internal or external to the chassis of the receiver for playing back audio video (AV) programs or as removable memory media. Also, in some embodiments, the receiver 14 can include a position or location receiver 272 such as but not limited to a cellphone receiver, global positioning satellite (GPS) receiver, and/or altimeter that is configured to e.g. receive geographic position information from at least one satellite or cellphone tower and provide the information to the processor 266 and/or determine an altitude at which the receiver 14 is disposed in conjunction with the processor 266. However, it is to be understood that that another suitable position receiver other than a cellphone receiver, GPS receiver and/or altimeter may be used in accordance with present principles to determine the location of the receiver 14 in e.g. all three dimensions.

Continuing the description of the receiver 14, in some embodiments the receiver 14 may include one or more cameras 274 that may include one or more of a thermal imaging camera, a digital camera such as a webcam, and/or a camera integrated into the receiver 14 and controllable by the processor 266 to gather pictures/images and/or video in accordance with present principles. Also included on the receiver 14 may be a Bluetooth® transceiver 276 or other Near Field Communication (NFC) element for communication with other devices using Bluetooth® and/or NFC technology, respectively. An example NFC element can be a radio frequency identification (RFID) element.

Further still, the receiver 14 may include one or more auxiliary sensors 278 (such as a motion sensor such as an accelerometer, gyroscope, cyclometer, or a magnetic sensor and combinations thereof), an infrared (IR) sensor for receiving IR commands from a remote control, an optical sensor, a speed and/or cadence sensor, a gesture sensor (for sensing gesture commands) and so on providing input to the processor 266. An IR sensor 280 may be provided to receive commands from a wireless remote control. A battery (not shown) may be provided for powering the receiver 14.

The companion device 16 may incorporate some or all of the elements shown in relation to the receiver 14 described above.

The methods described herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the Internet.

Figure 3:
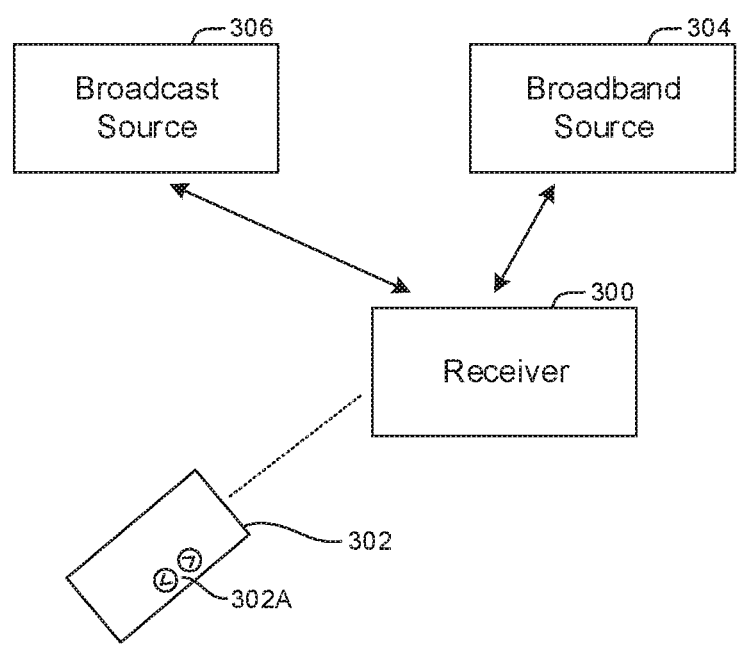
FIG. 3 is a simplified block diagram of a receiver of content from both a broadcast source and a broadband source.

Now referring to FIG. 3, a receiver 300 that may be implemented by any of the receivers described herein may be controlled by a wired or wireless remote control device 302 with channel up/down selectors 302A as shown to change from a first broadcast service (service 1) from a broadcast source 306 to a second broadcast service (service 2) from the broadcast source 306, receiving, in the interim while waiting for a new GOP for service 2 from the broadcast source 306, content of service #2 from a broadband source 304. The sources 304, 306 may be implemented by any of the respective sources described herein.

Figure 4:
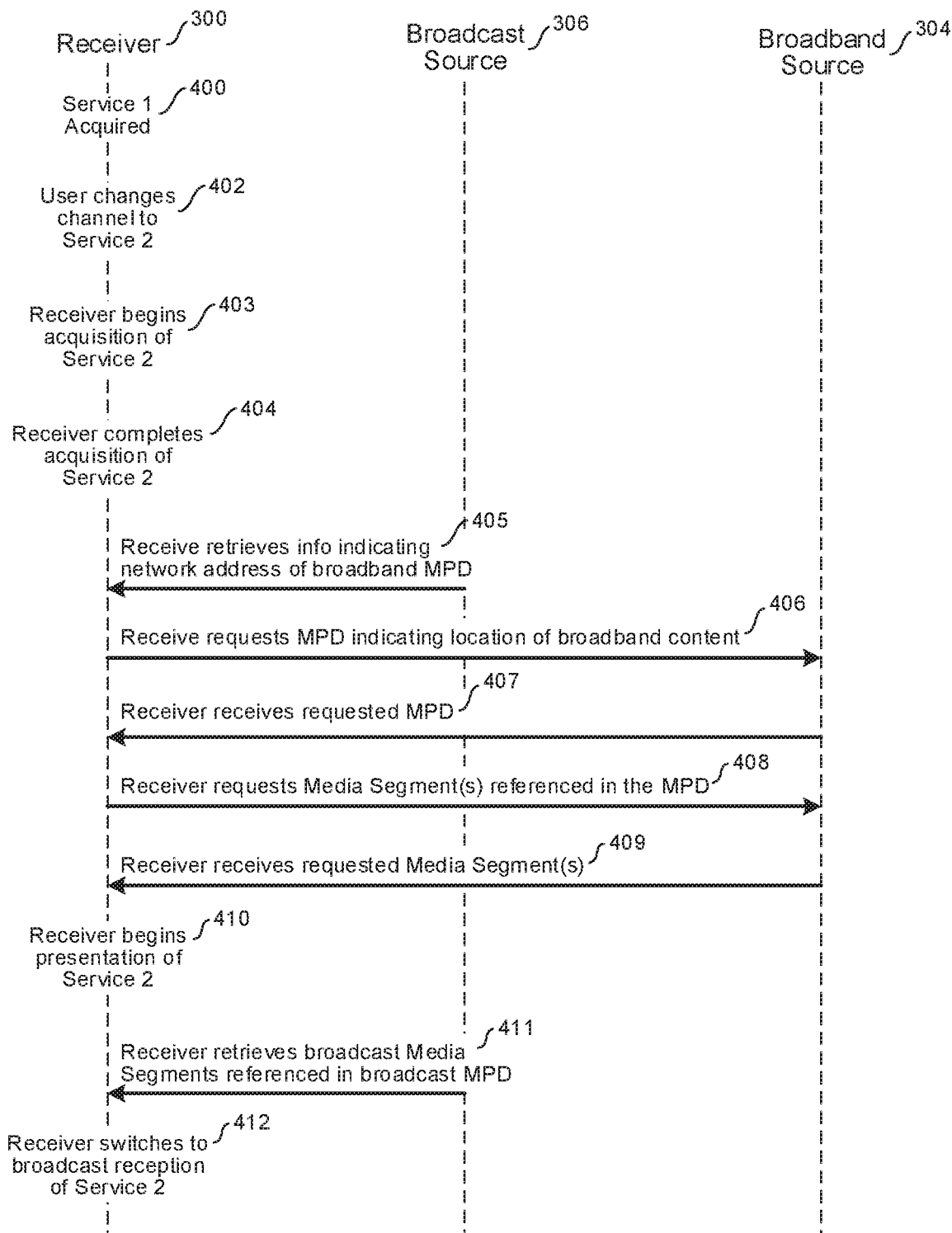
FIGS. 4 and 5 are timeline diagrams illustrating various embodiments of messaging consistent with present principles, with time progressing from top to bottom in these figures.

FIG. 4 illustrates a first example. As indicated at 400, the receiver 300 initially receives broadcast service #1 from the broadcast source 306. Next, as indicated at 402 the receiver 300 receives a channel change command, typically received from the RC 302, to change from service #1 to service #2. At 403 the receiver begins acquisition of the second service (2), completing acquisition at 404. In this context, "acquisition" refers to the RF tuning to the broadcast signal and physical layer pipe(s) carrying the new service (if applicable) and processing of the lower-layer signaling, culminating in the reception of the service-layer signaling, in this case, the SLT.

As indicated at 405, signaling information, including the network address at which an MPD associated with the second service (2) can be obtained via broadband, is received from the broadcast source 306. Using this information, as indicated at 406, the receiver 300 requests information from the broadband source 304 regarding the MPD associated with the second service (2). This request typically includes the address of the receiver 300. In response to the receiver 300's request, as indicated at 407 the broadband source 304 returns the MPD of the second service to the receiver 300.

With this information, as indicated at 408 the receiver 300 requests service #2 packets from the broadband source 304 as they are referenced in the MPD received from the broadband source 304. Typically these packets being accessed via broadband are the initial few segments or GOP of the new service #2 being broadcast at the time the channel change command is identified, so that it appears to the viewer of the receiver 300 that the channel has changed from service #1 to service #2 without undue latency. In an example embodiment, the receiver accesses by the broadband path one or more previously broadcast segments or GOP, thus, to begin playback at a point offset from the live edge. In parallel, the receiver begins receiving and buffering segments from the broadcast source. After making the appropriate adjustment to the MPD, the receiver 300 continues to fetch, receive and render packets from the broadband source 304 as indicated at 409 until the packets of service #2 from the broadcast source 306 have arrived at the receiver 300 for presentation as indicated at 410. The receiver 300 then presents the media segments from the broadcast service #2 as referenced in the broadcast MPD and as indicated at 411. Then, as indicated at 412 the receiver ceases to access the service #2 packets from the broadband source 304, picking up the presentation of packets from the broadcast source 306 where it leaves off the presentation of packets from the broadband source 304 so as to switch sources seamlessly to the viewer.

Figure 5:
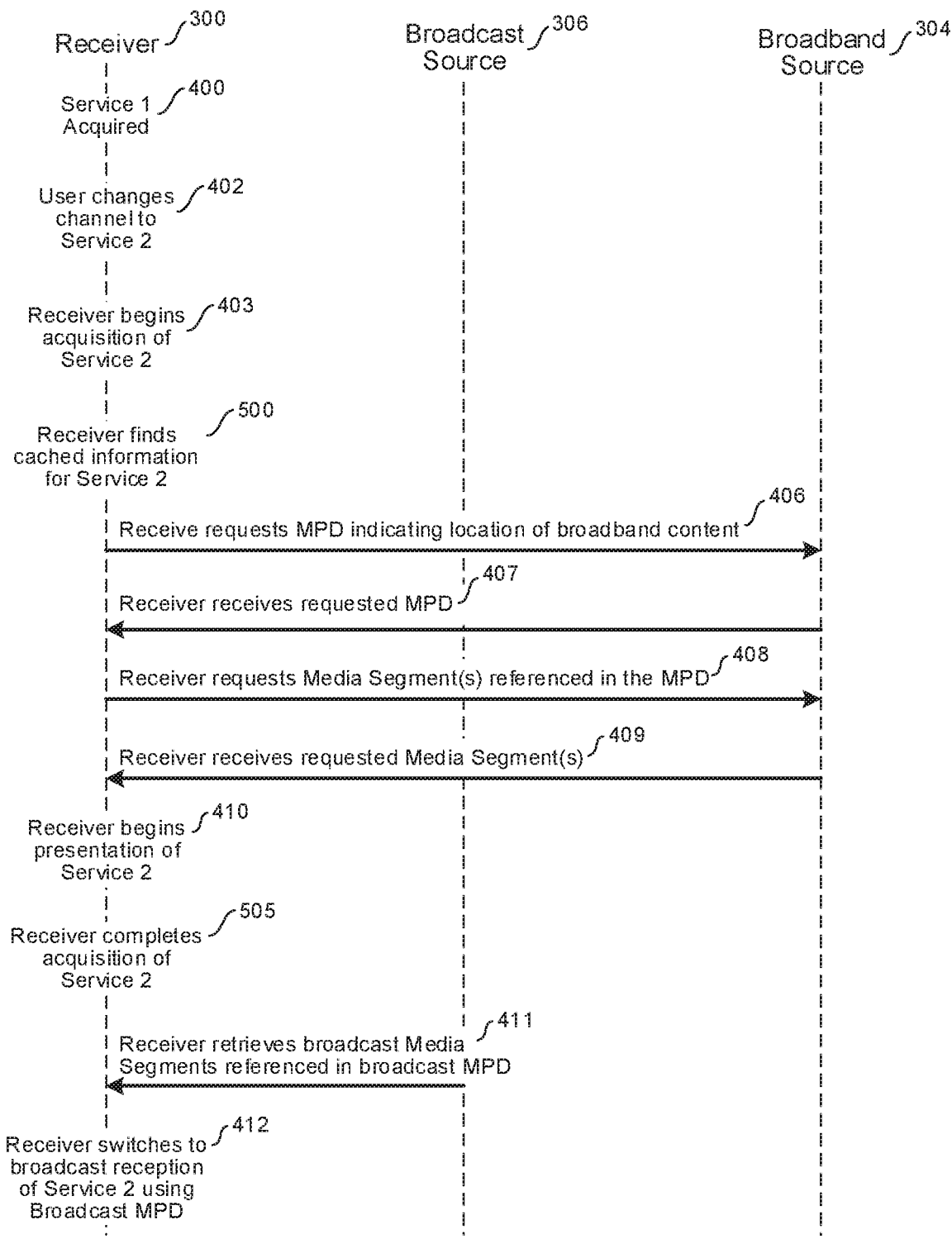

FIG. 5 illustrates a second example. As indicated at 400, the receiver 300 initially receives broadcast service #1 from the broadcast source 306. Next, as indicated at 402 the receiver 300 receives a channel change command, typically received from the RC 302, to change from service #1 to service #2, beginning acquisition of the second service (#2) as indicated at 403.

In contrast to FIG. 4, as indicated at 500 in FIG. 5 the receiver 300 locates in a local storage previously cached information about channel #2, typically from an earlier acquisition of that service. In this FIG. 5 example, the step of retrieving the location of broadband source 304 from the broadcast signal is skipped, on the assumption that it has not changed since the last time this service was acquired. In most cases, this will be a valid assumption as broadcasters have infrequent need to change the location of the broadband source 304 or other parameters in the SLT.

As indicated at 406 the receiver requests from the broadband source 304 an MPD indicating a network location of content related to the second service, receiving the requested MPD at 407 and requesting media segments referenced in the MPD from the broadband source 304 at 408.

The requested media segments are received from the broadband source as indicated at 409. Typically these packets being accessed via broadband are the initial few segments or GOP of the new service #2 being broadcast at the time the channel change command is identified, so that it appears to the viewer of the receiver 300 that the channel has changed from service #1 to service #2 without undue latency. In an example embodiment, the receiver accesses by the broadband path one or more previously broadcast segments or GOP, thus, to begin playback at a point offset from the live edge. In parallel, the receiver begins receiving and buffering segments from the broadcast source. After making the appropriate adjustment to the MPD, the receiver 300 begins to present the new service (#2) as indicated at 410 using the media segments from the broadband source 304. Upon completing acquisition of the new service (#2) from the broadcast source 306 at 505, the receiver retrieves the broadcast media segments at 411 using the broadcast MPD. The receiver 300 then presents the broadcast service #2 and as indicated at 412 ceases to access the service #2 packets from the broadband source 304, picking up the presentation of packets from the broadcast source 306 where it leaves off the presentation of packets from the broadband source 304 so as to switch sources seamlessly to the viewer.

Figure 6:
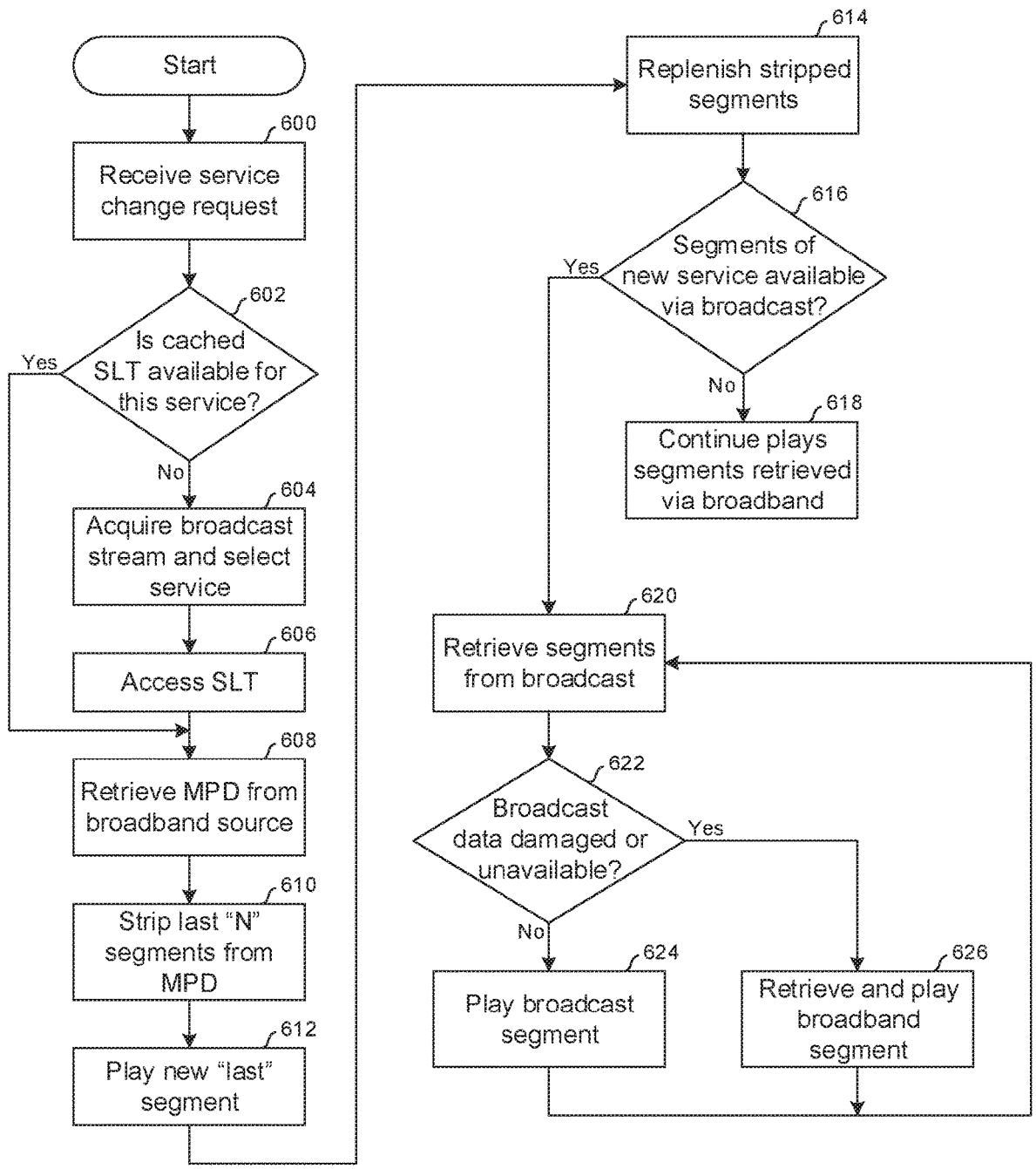
FIG. 6 is a flow chart of example overall logic consistent with present principles.

FIG. 6 illustrates overall logic consistent with the above disclosure. Commencing at block 600, a channel change command is identified.

Decision diamond 602 indicates that if a service list table (SLT) for the newly tuned-to service is not locally available in cache, the logic moves to block 604 to begin to acquire the broadcast stream and selected service. The SLT is accessed at block 606 from the broadcast stream and the logic moves to block 608. On the other hand, when the SLT is determined to have been previously captured and stored at decision diamond 602 (e.g., through either a tune to this service or a "channel scan" that included this first service) the receiver assumes the previously stored SLT still contains a valid computer network location to obtain the MPD and proceeds directly to block 608.

Using the SLT, a segment timeline MPD is accessed at block 608 from the broadband source. At block 610, recognizing that the receiver will attempt to begin play at the last segment in the MPD, either the receiver or the broadband source strips the last "N" segments from the MPD prior to the receiver attempting to play the last segment. N is an integer and is established with a balance in mind. The more segments that are stripped, the greater the delay period from the broadcast live point to play at the receiver, with the benefit being that channel change speed is increased and more time is afforded to repair damaged data as discussed further below.

Content identified by the MPD, truncated after the step at block 610, is then played at block 612 starting from the "new" last segment of the truncated MPD. Once this begins to occur, the segments that had been stripped can be immediately restored or replenished into the MPD at block 614 to enable the receiver to continue to play the newly tuned-to channel from the broadband source, delayed from the actual broadcast live point by the length of time it takes to play the "N" stripped segments.

Not only does this process afford quicker service change as perceived by the user by providing segments from broadband before they are available from broadcast, but as discussed below it also affords the opportunity to identify in the broadcast any damaged data elements that can be repaired during the delay period on the computer network. Because the repaired data elements are still to be played in the future by the receiver, they can be cached and inserted into the content as replacements to the damaged broadcast data elements. Similarly, if a damaged segment is encountered later, the receiver can fetch an undamaged version from the broadband source and use it as a replacement segment.

Decision diamond 616 indicates in flow chart form that if the newly tuned-to broadcast service is not yet available because the receiver is waiting for the initial GOP of the newly-tuned to broadcast service, access to these segments continues to be afforded to the receiver from the broadband source at block 618. Decision diamond 616 indicates in flow chart form that once the segments from the newly tuned-to broadcast service have become available, at block 620 the receiver seamlessly switches from presenting the newly tuned-to service using segments from the broadband source to presenting broadcast segments from the broadcast source. This is done by identifying that the last broadband segment is segment "X", with play being switched to broadcast segment X+1.

Moving to decision diamond 622, it is determined or identified whether broadcast data including media segments is damaged or unavailable. If not, the broadcast segments are played at block 624 before looping back to block 620. Otherwise, repaired or otherwise acceptable segments corresponding to the content of the damaged or unavailable data are retrieved from the broadband source and played at block 626. The logic then loops back to block 620.

Thus, parts or all of ATSC 3.0 segments received with errors via the broadcast path may be repaired by the receiver by access to those same segments provided by the broadband server located at the address indicated by the broadcaster in the SLT. Currently ATSC 3.0 uses Forward Error Correction (FEC) to repair broadcast bits which is computationally intensive and slow. By caching segments in the cloud, an ATSC 3.0 content program is first pushed to a server and subsequently to the OTA broadcaster. This technique uses a segment file server. The technique repairs data behind the current live point of the broadcast to allow packet repair.

With the above in mind, an indication of a change of service by the receiver from a first broadcast service to a second broadcast service can be received and responsive to receiving the SLT table of the second broadcast service over broadcast, thus identifying the location of a broadband computer network that provides parallel availability of the second broadcast service content and media presentation description (MPD) from the broadband computer network.

It may now be appreciated that in example implementations, an ATSC3.0 receiver presents the content of the second broadcast service from the source of computer network ATSC 3.0 content until content from the second broadcast service is available over broadcast for presentation by the first receiver. The receiver can remove at least the last "N" segments from a segment timeline data structure associated with the second service media presentation description (MPD), wherein "N" is an integer at least equal to one, to generate an MPD with a truncated segment timeline data structure having a last segment that is earlier than the segment being sent or being prepared to be sent over broadcast, to then retrieve the last content segment(s) in the truncated data structure over broadband, to present the content starting with these last segment(s), to replace the truncated data structure with the original data structure, to retrieve over the computer network any additional segments indicated by this original data structure until the same content segments and the MPD become available in the receiver over broadcast.

In a different use case scenario, an ATSC 3.0 receiver maintains a stored knowledge of the second broadcast service's computer network location from previously scanning or tuning to this second service, beginning the process of receiving the MPD and content segments prior to the completion of the RF tuning for additional improvements to service change time. The ATSC 3.0 receiver may assess how many segments should be removed from the MPD truncated data structure such that packet repair through complete segment replacement can be achieved using the computer network. This calculation can account for segment size in bytes, segment length in seconds, audio video segment synchronization, average computer network speeds, internal buffering times before rendering.

With respect to altering the MPD at step 608 (removing one or more segments) and the "replenishment" thereof to recover the removed parts and the media segments they referenced, the receiver is made to begin playback not right at the live edge, but removed a little bit in time from that (one or two media segment times, typically two to four seconds). This way, while playing out one media segment, the complete next segment can be obtained with sufficient time, if it fails to be completely or accurately retrieved from broadcast, to retrieve a copy of the next segment from the broadband server. Without the extra time the receiver takes at the beginning to buffer an extra segment or two as disclosed herein, there would be insufficient time to correct a bad segment. For this reason, MPD alteration is tied to the ability to use broadband to recover segments retrieved in error from broadcast, without causing any playback artifacts.

In case of poor reception (for example, a mobile receiver), the receiver may buffer several segments (for a longer delay from the live point) before beginning playback. Note that the MPD retrieved from the broadband source 304 and the MPD retrieved from the broadcast source 306 should be identical to each other, with both describing the same media segment as being the "live edge" of the broadcast. The broadband delivered MPD may describe not only the live edge segment, but also "N" other earlier segments where "N" is an integer equal to one or more. Thus, if the receiver removes, for example, the last segment by editing it out of the MPD, given that truncated MPD, the receiver will retrieve a slightly older media segment and begin the playout timeline with that one. In parallel, the receiver can retrieve the live edge segment from broadcast and buffer it. The buffer will then have an extra segment's worth of video in it at any time, even though to the user, the channel change occurred quickly, as expected.

It will be appreciated that whilst present principals have been described with reference to some example embodiments, these are not intended to be limiting, and that various alternative arrangements may be used to implement the subject matter claimed herein.

What is claimed is:

1. A digital television system comprising:
    at least one receiver of digital television content with segment timeline signaling, the receiver being programmed with instructions to configure the receiver to:
    identify a command to tune to a first service not currently tuned to;
    responsive to the command, access a service list table (SLT) to identify a computer network location at which to obtain information pertaining to accessing segments of a broadcast media presentation description (MPD) associated with the first service;
    remove at least a last "N" segments from a segment timeline data structure in the MPD associated with the first service, wherein "N" is an integer at least equal to one, to render a truncated MPD having a last segment;
    use the information pertaining to accessing segments associated with the first service to access, on the computer network, the last segment in the truncated MPD;
    play at least the last segment; and
    responsive to accessing the last segment in the truncated MPD, replenish the truncated MPD with the last "N" segments from the segment timeline data structure to permit play of the last "N" segments from the segment timeline.

2. The digital television system of claim 1, wherein the instructions configure the receiver to:
    responsive to receiving, via broadcast, segments associated with the first service, change from accessing segments associated with the first service on the computer network to accessing segments associated with the first service via broadcast.

3. The digital television system of claim 2, wherein the instructions configure the receiver to:
    play a segment "X" associated with the first service and accessed on the computer network and switch to broadcast by playing a segment "X+1" received via broadcast.

4. The digital television system of claim 3, wherein the segment "X+1" is delayed from a live point in a broadcast of the first service by a delay period greater than zero.

5. The digital television system of claim 4, wherein during the delay period, at least a first data element associated with the first service and identified as being damaged is repaired by access to a replacement first data element retrieved via the computer network to render a repaired data element and provided to the receiver for play of the repaired data element in lieu of the first data element.

6. The digital television system of claim 1, wherein the SLT is a first SLT broadcast on the first service that signals the computer network location at which to obtain a parallel copy of the broadcast MPD pertaining to accessing segments associated with the first service.

7. The digital television system of claim 1, comprising:
    at least one source of broadcast Advanced Television Systems Committee (ATSC) 3.0 content configured to communicate broadcast services to the receiver; and
    at least one source of computer network ATSC 3.0 content configured to communicate broadband content to the receiver.

8. A digital television system comprising:
    at least one source of computer network digital television content configured to respond to a change of service by at least a first receiver from a first broadcast service to a second broadcast service by providing content of the second broadcast service to the first receiver over a broadband computer network, wherein the system is configured to:
    remove at least some segments from a segment timeline data structure associated with the second broadcast service to produce a truncated data structure having a last segment;
    access, using the first receiver and from the source of computer network digital television content, at least the last segment in the truncated data structure;
    responsive to accessing at least the last segment, replenish the truncated data structure with at least one segment from the segment timeline data structure; and
    using the first receiver, present the content of the second broadcast service from the source of computer network digital television content.

9. The digital television system of claim 8, wherein the source of computer network ATSC 3.0 content comprises at least one processor programmed with instructions executable to:
    receive an indication of the change of service by the first receiver.

10. The digital television system of claim 9, wherein the indication is received from the first receiver.

11. The digital television system of claim 9, wherein the indication is received from the source of broadcast digital television content.

12. The digital television system of claim 9, wherein the instructions are executable to, responsive to receiving the indication, transmit at least one signal to the first receiver indicating a network location to obtain the content of the second broadcast service from the broadband computer network.

13. The digital television system of claim 9, wherein the instructions are executable to, responsive to receiving the indication, transmit the at least one signal in a media presentation description (MPD).

14. The digital television system of claim 8, comprising the first receiver, wherein the system is programmed with executable instructions to:
remove at least a last "N" segments from the segment timeline data structure associated with the second service, wherein "N" is an integer at least equal to one; and
using the first receiver, present the content of the second broadcast service from the source of computer network digital television content until content from the second broadcast service is available for presentation by the first receiver.

15. In a digital television system, a method comprising:
receiving an indication that a receiver of broadcast digital TV changes from a first service to a second service; and
responsive to the indication, enabling access of content of the second service by the receiver over a broadband computer network, wherein the method comprises:
removing segments from a segment timeline data structure associated with the second service to produce a truncated data structure having a last segment;
accessing, from the broadband computer network, at least the last segment in the truncated file;
responsive to accessing at least the last segment, replenish the truncated file with at least some segments from the segment timeline data structure; and
presenting the content of the second service from the broadband computer network.

16. The method of claim 15, comprising:
responsive to the indication, transmitting a signal to the receiver indicating a network address at which the content of the second service can be obtained.

17. The method of claim 15, comprising:
responsive to the indication, transmitting to the receiver the content of the second service.

18. The method of claim 16, comprising transmitting the signal in a media presentation description (MPD) file.

19. The method of claim 15, comprising:
removing at least a last "N" segments from the segment timeline data structure associated with the second service, wherein "N" is an integer at least equal to one; and
presenting the content of the second service from the broadband computer network until content from the second service is available via broadcast for presentation by the first receiver.

* * * * *